July 8, 1952 K. W. HILDEBRANDT 2,602,761
DIFFUSION APPARATUS
Filed Dec. 1, 1948 3 Sheets-Sheet 2
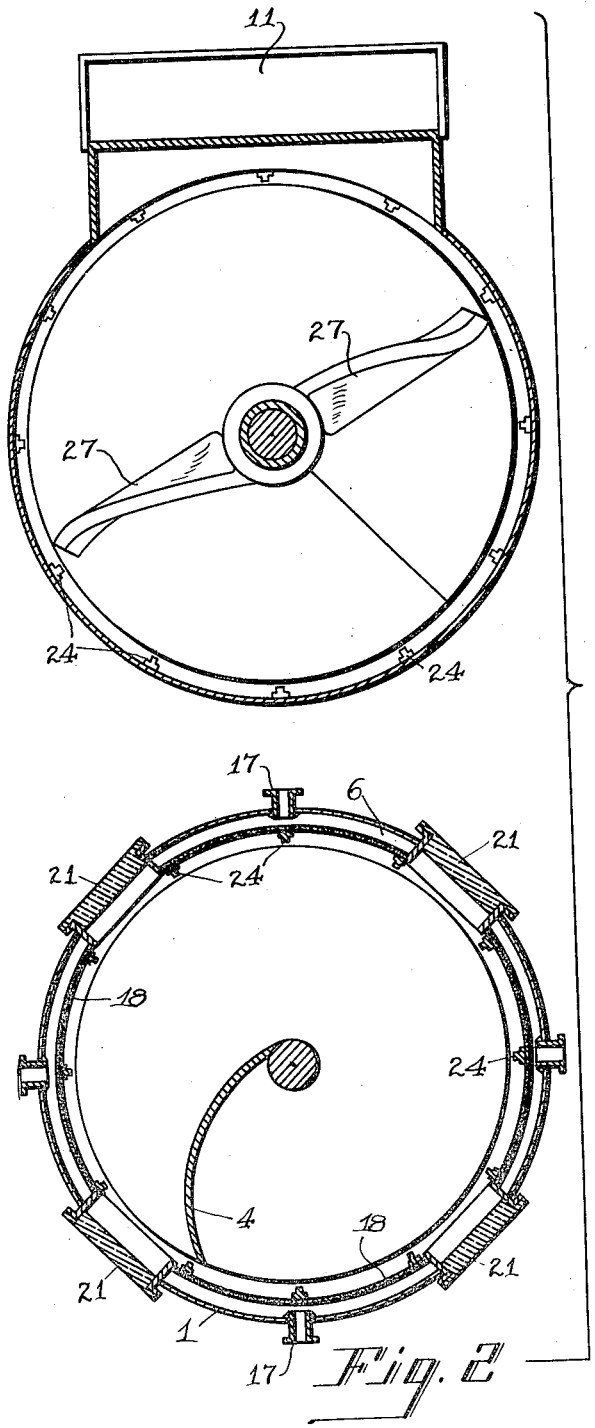
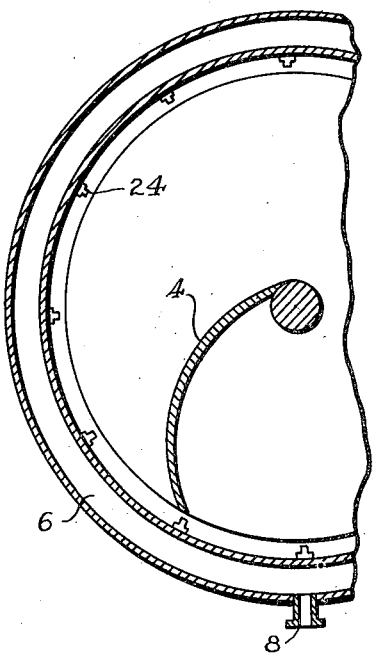
Fig. 3
Fig. 2
INVENTOR.
KARL WILHELM HILDEBRANDT
BY
Richardson and David
his ATT'YS.

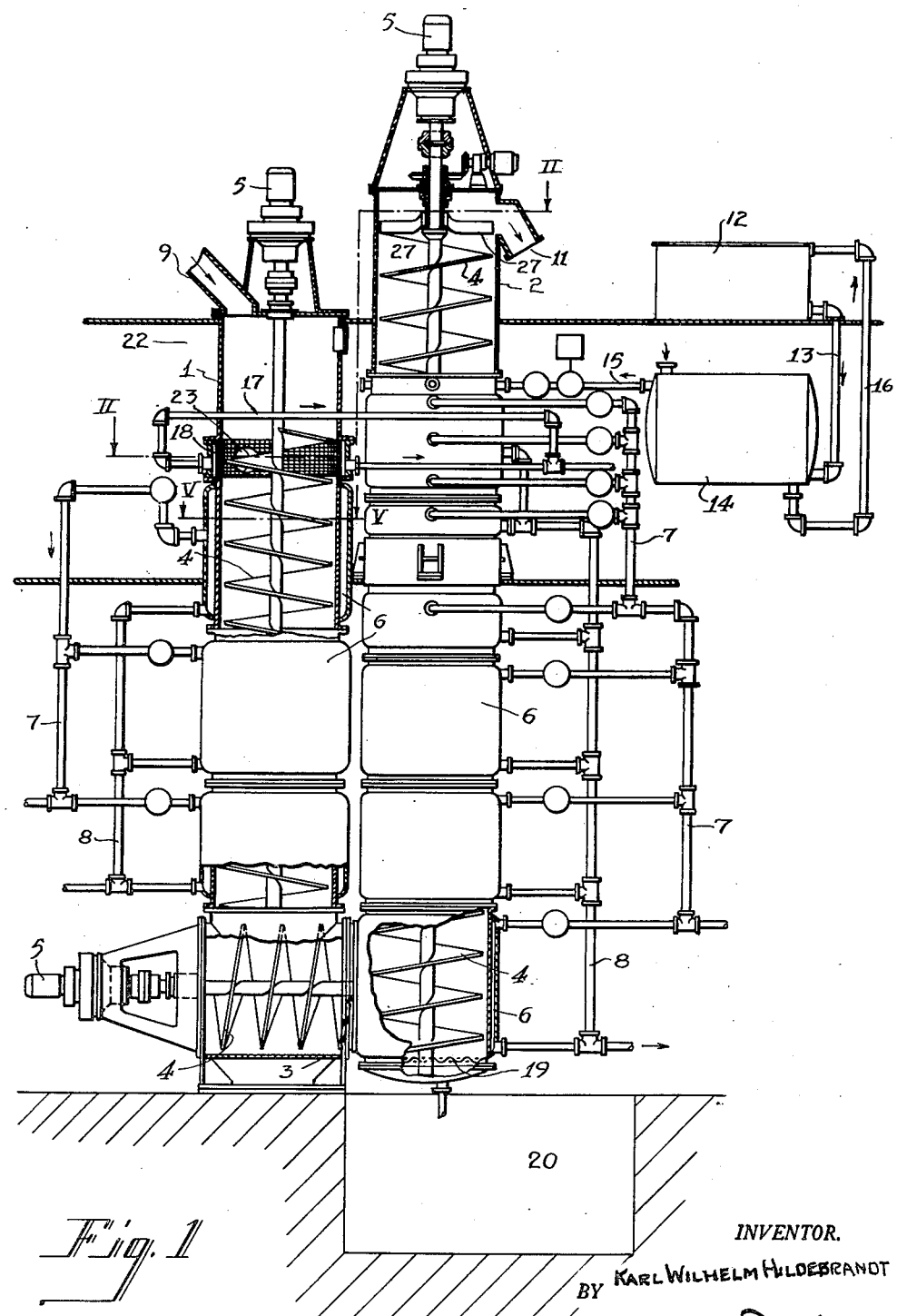

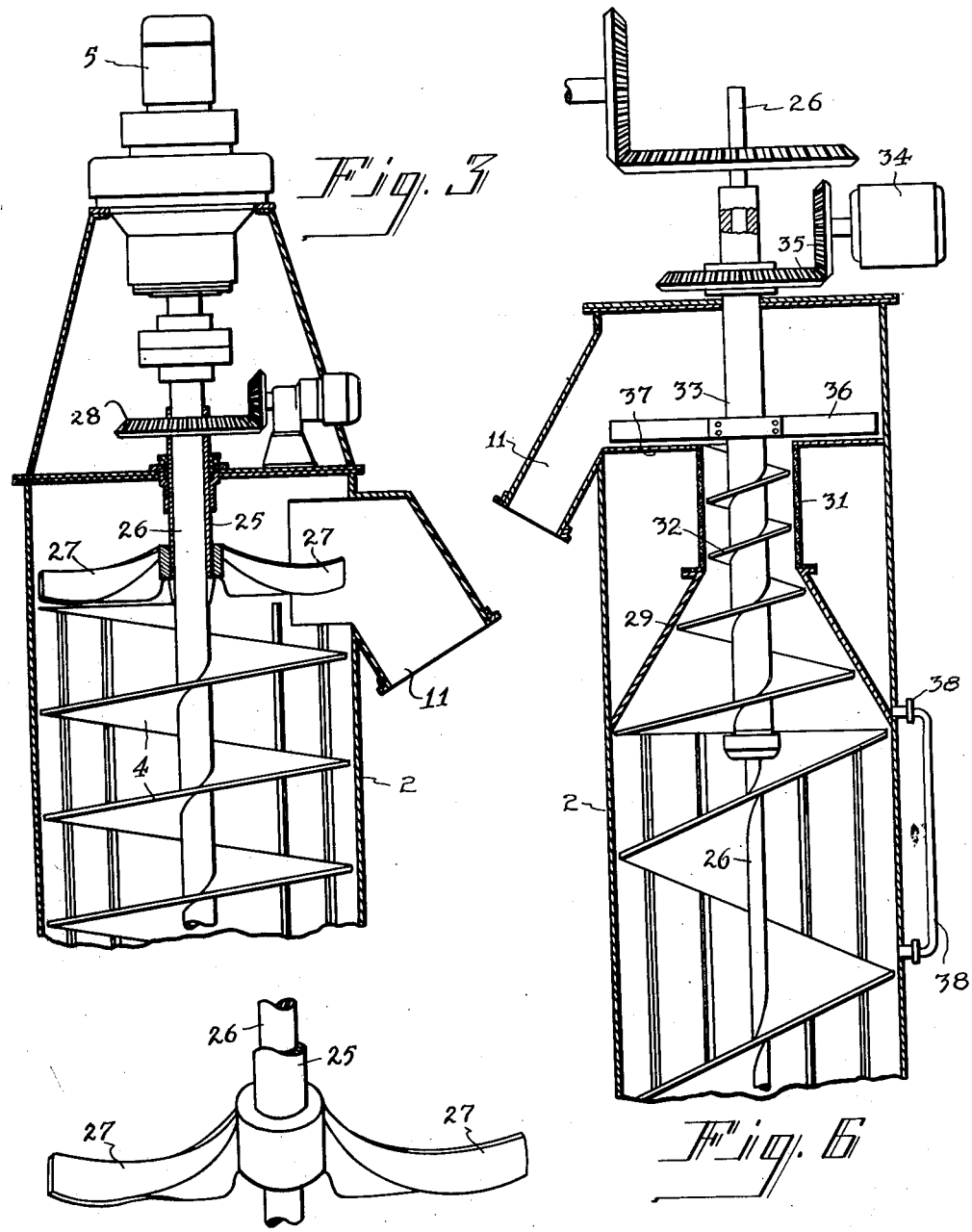

Patented July 8, 1952

2,602,761

UNITED STATES PATENT OFFICE 2,602,761

DIFFUSION APPARATUS

Karl Wilhelm Hildebrandt, Hamburg, Germany, assignor to Superior Sugar Extraction, Inc., New York, N. Y., a corporation of Delaware Application December 1, 1948, Serial No. 62,912
In Belgium June 28, 1948

12 Claims. (Cl. 127—7)

1

The invention relates to an apparatus for the continuous elution of sugar from sliced beets and the process of eluting the sugar. Heretofore, sliced beets were worked up exclusively in diffusion batteries, that is, in a series of vessels, which were filled successively with sliced beets and were emptied after elution of the slices.

It has been the aim for a long time to substitute continuously operating devices for such batteries. However, the previously known constructions did not meet practical demands. The diffusion processes now in use do not eliminate loss of sugar and so far as known no method has been found to accomplish a practical exhaustion of all the sugar content of the beets.

Contrary thereto, the present invention provides the long sought for apparatus and method for the continuous elution of sugar from sliced beets commercially, and this new apparatus is suitable for replacing the previously used diffusion batteries.

It is an object of the present invention to provide for the continuous elution of sugar from cut or sliced beets in a commercial manner and to replace the heretofore system utilizing diffusion batteries.

It is another object of the present invention to utilize the press water in the elution treatment of the slices, and cause recirculation thereof to thereby serve as elution water.

It is a still further object of the invention to extract practically all of the sugar content of the beets, and thereby reduce to a minimum loss of sugar.

The new method and continuously operating apparatus of this invention has proven its practical value in every respect. It operates accurately and reliably, and as compared with the diffusion batteries, it requires only very little supervision at maxium capacity.

Another great advantage of the invention as compared to a diffusion battery consists in that even frozen beets, the elution of which in diffusion batteries causes great difficulties due to the rise in pressure, can be treated in the new device and according to the new method just as well as non-frozen beets. And counterwise, the new apparatus yields a crude juice of equal strength and quality as a juice from a diffusion battery, and it is also superior to the latter because in the new apparatus of this invention, no water, which itself contains sugar in varying, but always substantial strength, is discharged as waste water because it still contains sugar.

Moreover, according to the present invention,

2 part of the liquid which is otherwise obtained as press water is retained within the apparatus and serves there immediately for the elution of the slices, while the slices themselves are discharged in a condition in which they contain less liquids and sugar than slices discharged from a diffusion battery, i. e., according to the present method the finally discharged slices contain only slight traces of sugar in contrast to the sugar content remaining in discharged battery slices.

The entire remainder of the press water is recirculated into the apparatus and serves there equally as elution water, thus being completely utilized.

In contrast herewith, in a diffusion battery, none of the press water can be utilized because it cannot be returned to the battery. The sugar in the press water is therefore lost, and the removal of the press water causes additional expense.

The new apparatus according to this invention comprises two vertical towers connected by a cross-member. Heating jackets, which are subdivided in several places, surround the towers and the cross-member. Conveyor screws which fill the free inner space of these three parts completely, are each extended as closely as possible to the next following screw. Bearings for the conveyor screws are arranged outside of the elution chambers. Strong guide bars are arranged within the towers and a pressure device for the eluted slices is located within the second tower immediately before the discharge opening for the eluted slices. The pressure device may be of various construction.

According to one embodiment of the invention, the pressure device comprises a bushing surrounding the upper part of the screw conveyor shaft, an electric motor with gearing to effect a rotation of the bushing at a speed exceeding that of the screw conveyor shaft, and curved stirring blades on the bushing.

According to another embodiment of the invention, the pressure device comprises an upwardly tapering cone arranged in the upper part of the slice discharge tower, and forming a strainer element, a worm arranged in the cone and rotating at a speed exceeding that of the conveyor screw, and in the opposite direction, and an electric motor with gearing for driving the worm. The slices are charged into the first tower at its top, pass downwardly through the first tower, move through the cross member to the second tower, pass upwardly through the latter and are discharged from the second tower at its top. Countercurrent to the movement of the slices, water flows from the top of the second tower through the cross member to the top of the first tower where it leaves the apparatus as a sugar solution, i. e., the almost eluted slices at the top of tower No. 2 are washed out by the fresh water, while the slices entering tower No. 1 come in contact with the concentrated sugar solution, and such a method of countercurrent flow is an advantage according to the present invention.

The pressure device arranged according to the invention in the slice discharge tower renders possible a working method whereby part of the liquid contained in the eluted slices is pressed off immediately before the discharge of the slices from the apparatus, and this press water is combined with the fresh water entering the apparatus. The remaining liquid is pressed out of the slices outside of the apparatus and is returned to the elution device, preferably continuously and at the point of the apparatus in which the elution water flowing through the apparatus contains the same proportion of solutes, that is, the same density as the added press water. In the battery process the sugar content of the press water is lost, while in the present method the sugar content is substantially entirely saved.

The sub-divided heating jackets around the elution chambers permit maintenance of the necessary temperature which must be different in the different parts of the apparatus. The heating of the various parts can be effected independently in any desired manner, for instance, by fresh steam, exhaust steam, hot water, gas or electricity. The slice receiving tower is heated more than the discharge tower in order to bring the material rapidly up to the necessary high temperature. Heretofore, this caused considerable difficulties in the case of frozen beets, due to the high melting temperature required.

It is furthermore essential for a good functioning of the device that no fixed resistance is present in the path of the slices. The arrangement of the bearings inside of the elution chambers has been found to be particularly disadvantageous. Furthermore, it is necessary to provide a comparatively great number of guide bars on the walls of the towers. These guide bars must be particularly strong in the slice discharge tower. They prevent a circular movement of the slices on the same level, and force upward travelling of the slices.

It is essential that the slices do not pass through any part of the elution chambers where no conveyor elements are operating because the slices jam in such parts, and would be rapidly converted to a pulp, necessitating stopping and cleaning the apparatus. In order to avoid these disadvantages, the convolutions of the screws are made so large that they fill the free diameter of the elution chambers and furthermore, the last convolution of each screw is extended as closely as possible to the next following screw. As a result, the slices remain in continuous movement and jamming is prevented.

The stirring blades of the pressure device mounted on the rotary bushing have a special form. They are so curved that they exert downward pressure contrary to the upward movement of the eluted slices. The curvature is thus essentially the reverse as in a propeller. Furthermore, the blades are curved in the direction of rotation in order to move the material from the elution chamber to the chute. Due to this shape of the blades, in combination with the rapid rotation of the bushing, the stirring mechanism exerts a remarkable pressure upon the slice column. The conical strainer, according to the second embodiment of the pressure device, is preferably a ring stave strainer. The speed of rotation of the pressure worm can be regulated. The arrangement of the pressure device in the slice discharge tower immediately before the discharge opening has the effect that the eluted slices are freed of part of their fluid content inside of the apparatus immediately before their discharge. This fluid content, usually called press water once it has been pressed out, is combined with the entering fresh water and the mixture serves for the elution of the material. Because of this pre-pressing operation, the slices leave the apparatus with a lower fluid content than slices from diffusion batteries. The remaining fluid content is pressed out of the slices in the usual manner after their discharge from the apparatus, but, contrary to the previous methods, it is returned to the apparatus.

Further objects and advantages of the invention will appear from the following disclosure thereof together with the attached drawings which illustrate a certain form of embodiment thereof. This form is shown for the purpose of illustrating the invention since the same has been found to give satisfactory and reliable results, although it is to be understood that the instrumentalities of which the invention consists can be variously arranged and organized and that the invention is not limited to the precise arrangement and organization of the instrumentalities as herein shown and described.

Fig. 1 is a diagrammatic view of the new apparatus,

Fig. 2 is a section taken on line II—II of Fig. 1,

Fig. 3 is an enlarged section through the upper part of the slice discharge tower and a pressure device, Fig. 4 is a perspective view of a part of this pressure device, Fig. 5 is a section taken on the line V—V of Fig. 1, Fig. 6 is a sectional view of the upper part of the slice discharge tower with a different pressure device.

According to Fig. 1 the apparatus consists essentially of the slice receiving tower 1, the slice discharging tower 2, and the cross member 3, connecting the two towers. Each of these three parts is provided with a conveyor screw 4, which is driven by a rotary drive element 5. Towers and cross-member are surrounded by heating jackets 6 into which the heating fluid is supplied through inlet pipes 7 and from which it leaves through exit pipes 8. Tower 1 has a charging opening 9 for the slices to be eluted and tower 2 has a discharge chute 11 for the slices from which the sugar has been extracted. Fresh elution water enters tower 2 from reservoir 12 through 13, a pressure tank 14 connected to a pump (not shown) and pipe 15. The pressure tank 14 is also connected with reservoir 12 by return pipe 16 in the event that the pressure in tank 14 becomes too large, and the sugar solution leaves tower 1 at 17 through the crude juice strainer 18. Tower 2 is further provided with a bottom strainer 19 through which the entire liquid can be drawn off from the apparatus into a container 20 if necessary. Tower 1 has also an inspection window 21, a manhole 22, and four cleaning ports 23. Furthermore, the towers are provided with a series of test taps arranged at different levels and with connections for the introduction of the fluid pressed out of the slices.

In Fig. 2, the abutment or guide bars 24 of these towers 1 and 2 are shown.

In Fig. 3, a bushing 25 is mounted on the cover of tower 2, and surrounds the shaft 26 of the conveyor screw 4. The bushing 25 carries two blades 27 and is driven by means of the rotary drive element 5 over a conical gear 28.

Fig. 4 shows the special form of the blades 5 in the perspective view.

In Fig. 6 a second embodiment of the pre-pressing device is illustrated. A cone 29 is mounted in the head of the slice discharge tower 2. A cylindrical strainer of reduced diameter, preferably a stave ring strainer 31, is mounted on the cone 29. A correspondingly shaped worm 32 is arranged within the cone 29 and strainer 31 and receives rotary motion from the bushing 33 surrounding the shaft 26 of the conveyor screw. The bushing 33 is driven by an adjustable motor 34 over a conical gear 35. A discharge member 36 arranged immediately above the sheet metal cover 37 serves to move the material into the chute 11. The fluid pressed off the slices is returned to the eluting tower through the conduit 38. The pre-pressing devices illustrated in Figs. 4 and 6 are not intended to extract juices or liquid from the slices by squeezing them as the slices are to be discharged in their natural state. However, these devices bring the slices closer together and thus remove a part of the eluting liquid carried by and adhering to the eluted slices prior to their being discharged. In both cases the liquid thus removed is returned to the fresh eluting liquid entering the apparatus.

The apparatus operates as follows:

The slices entering the tower 1 at 9 are conveyed by the three screws 4 through the parts 1, 2 and 3 countercurrent to the eluting liquid. The latter enters tower 2 at 15 as fresh water and leaves tower 1 at 17 as a sugar solution. Consequently, the slices of beets are completely immersed in the eluting liquid as the extraction is carried out and the deteriorating effects resulting from the contact of the slices and the liquid with air are avoided. Prior to their discharge from the apparatus over chute 11, the eluted slices are subjected to a pre-pressing and pre-dehydrating operation by means of one of the two previously described pressure devices and returned.

There is no circular motion of the slices in towers 1 and 2, and the slices pass directly downward in tower 1 and directly upward in tower 2.

I claim:

1. In an apparatus for eluting sugar from sliced beets wherein there is a counter-current flow between slices of beets and an eluting liquid and the sliced beets are continuously introduced at one end and discharged from the other end of the apparatus in their natural shape without being reduced to pulp, the combination including two vertical elution towers connected by a cross-member, the first of said vertical towers having an inlet for receiving sliced beets at its head end and a discharge port located beneath said inlet for discharging raw juice and the second of said towers having a discharge port at its head end for discharging the eluted slices of beets and an inlet connected to a supply of eluting liquid located beneath said discharge port, centrally-disposed rotatable shafts located inside of said towers and said cross-member, each of said shafts being supported, respectively, by a single bearing, said bearings being located outside of the elution towers and the cross-member, a plurality of vertical guide bars spaced about the inner periphery of each of the towers and conveyor screws carried on said shafts, each of said conveyor screws reaching to the next following conveyor screw with the side edges of the conveyor screws in the towers extending to the vertical guide bars therein.

2. In an apparatus for eluting sugar from sliced beets, the combination as defined in claim 1 which includes sub-divided heating jackets surrounding said towers and the cross-member.

3. In an apparatus for eluting sugar from cut sections of sugar-bearing material wherein there is a counter-current flow between the cut sections of the material and an eluting liquid and the cut sections are continuously introduced at one end and discharged from the other end of the apparatus in their natural shape without being reduced to a pulp, the combination of two upstanding elution towers connected at their lower ends by a cross-member, the first of said towers having an inlet for receiving cut sections of a sugar-bearing material at its head end and a discharge port located beneath said inlet for discharging raw juice, the second of said towers having a discharge port at its head end for discharging the eluted sections of the sugar-bearing material and an inlet connected to a supply of fresh eluting liquid located beneath the last-mentioned discharge port, centrally disposed, rotatable shafts located in said towers and cross-member, each of said shafts being supported, respectively, by a single bearing, said bearings being located outside of the elution towers and the cross-member, a plurality of spaced guide bars carried on the inner walls of said towers and extending lengthwise thereof, conveyor screws carried by the shafts in the towers and the cross-member, each of the conveyor screws reaching to the next following conveyor screw and the side edges of the conveyor screws in the towers extending to the guide bars therein, and liquid-removing means located at the head end of the second tower immediately before the discharge port therein for removing a portion of the eluting liquid surrounding and adhering to the eluted sections of the sugar-bearing material prior to the discharge thereof from the second tower.

4. In an apparatus for eluting sugar from cut sections of sugar-bearing material the combination as defined in claim 3 wherein the liquid-removing means includes a rotatable bushing surrounding the upper part of the rotatable shaft in the second tower, curved blades carried by said bushing, said blades being reversely curved and curved in their direction of rotation and means for rotating said bushing and blades independently of the rotatable shaft.

5. In an apparatus for eluting sugar from cut sections of sugar-bearing material, the combination as defined in claim 3 wherein the liquid-removing means includes an upwardly tapering cone located in advance of the discharge port in the second tower, a strainer located at the upper end of said cone, a rotatable bushing surrounding the upper part of the rotatable shaft in the second tower, a worm carried by said bushing and located within said upwardly tapering cone and means for rotating said bushing and the worm in an opposite direction to the direction of rotation of the conveyor screw in the second tower.

6. In an apparatus for eluting sugar from sliced beets wherein there is a counter-current flow between slices of beets and an eluting liquid and the sliced beets are continuously introduced at one end and discharged from the other end of the apparatus in their natural shape without being reduced to a pulp, the combination of two upstanding elution towers connected at their lower ends by a cross-member, the first of said towers having an inlet for receiving sliced beets at its head end and a discharge port located beneath said inlet for discharging raw juice, the second of said towers having a discharge port at its head end for discharging the eluted slices of beets and an inlet connected to a supply of fresh eluting liquid located beneath the last-mentioned discharge port, centrally disposed, rotatable shafts located in said towers and cross-member, each of said shafts being supported, respectively, by a single bearing, said bearings being located outside of the elution towers and the cross-member, a plurality of spaced guide bars carried on the inner walls of said towers and extending lengthwise thereof, conveyor screws carried by the shafts in the towers and the cross-member, each of the conveyor screws reaching to the next following conveyor screw and the side edges of the conveyor screws in the towers extending to the guide bars therein, sub-divided heating chambers surrounding said towers and cross-member, and liquid-removing means located at the head end of the second tower immediately before the discharge port therein for removing a portion of the eluting liquid surrounding and adhering to the eluted slices prior to the discharge of said slices from the second tower.

7. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, said towers being in communication with each other at their lower ends, the first of said towers having inlet and outlet ports at its head end for the introduction of cut sections of a sugar-bearing material into the apparatus and for the discharge of raw juices therefrom, the second of said towers having discharge and inlet ports at its head end for the discharge of the eluted, cut sections of the sugar-bearing material from the apparatus and for the introduction of an eluting liquid therein, centrally disposed, rotatable shafts located in said towers, each of said shafts being supported, respectively, by bearings located outside of the path of movement of the cut sections through the towers, conveyor screws carried by the shafts in the towers and guide means projecting inwardly from the inner walls of each of the towers, said guide means having portions engaging with the cut sections and preventing circulatory movement thereof on the same level.

8. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, said towers being in communication with each other at their lower ends, the first of said towers having inlet and outlet ports at its head end for the introduction of cut sections of a sugar-bearing material into the apparatus and for the discharge of raw juices therefrom, the second of said towers having discharge and inlet ports at its head end for the discharge of the eluted, cut sections of the sugar-bearing material from the apparatus and for the introduction of an eluting liquid therein, centrally disposed, rotatable shafts located in said towers, each of said shafts being supported, respectively, by bearings located outside of the path of movement of the cut sections through the elution towers, conveyor screws carried by the shafts in the towers, said conveyor screws being continuous and extending throughout the length of each of the towers, and guide means projecting inwardly from the inner walls of each of the towers, said guide means having portions engaging with the cut sections and preventing circulatory movement thereof on the same level.

9. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, said towers being in communication with each other at their lower ends, the first of said towers having inlet and outlet ports at its head end for the introduction of cut sections of a sugar-bearing material into the apparatus and for the discharge of raw juices therefrom, the second of said towers having discharge and inlet ports at its head end for the discharge of the eluted but sections of the sugar-bearing material from the apparatus and for the introduction of an eluting liquid therein, centrally disposed, rotatable shafts located in said towers, each of said shafts being supported, respectively, by bearings located outside of the path of movement of the cut sections through the elution towers, conveyor screws carried by the shafts in the towers and guide means projecting inwardly from the inner walls of each of the towers for preventing circulatory movement of the cut sections of material on the same level, said guide means comprising a plurality of spaced guide members located on the inner walls of each of the towers and extending lengthwise thereof, the ends of said guide members extending inwardly to the edges of the conveyor screws in the respective towers.

10. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, a cross-member connecting said towers at their lower ends, the first of said towers having inlet and outlet ports at its head end for the introduction of cut sections of a sugar-bearing material into the apparatus for the discharge of raw juices therefrom, the second of said towers having discharge and inlet ports at its head end for the discharge of the eluted sections of the sugar-bearing material from the apparatus and for the introduction of an eluting liquid therein, a centrally disposed, rotatable shaft located in each of said towers and the cross-member, each of said shafts being supported, respectively, by bearings being located outside of the path of movement of the cut sections through the towers and cross-member, continuous conveyor screws carried by the shafts in the towers and the cross-member, the discharge end of each of the conveyor screws reaching to the next following conveyor screw and guide means projecting inwardly from the inner walls of each of the towers for preventing circulatory movement of the cut sections of material on the same level.

11. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, a cross-member connecting said towers at their lower ends, the first of said towers having inlet and outlet ports at its head end for the introduction of cut sections of a sugar-bearing material into the apparatus for the discharge of raw juices therefrom, the second of said towers having discharge and inlet ports at its head end for the discharge of the eluted sections of the sugar-bearing material from the apparatus and for the introduction of an eluting liquid therein, a centrally disposed, rotatable shaft located in each of said towers and the cross-member, each of said shafts being supported, respectively, by bearings located outside of the path of movement of the cut sections through the towers and cross-member, continuous conveyor screws carried by the shafts in the towers and the cross-member, the discharge end of each of the conveyor screws reaching to the next following conveyor screw and guide means projecting inwardly from the inner walls of each of the towers for preventing circulatory movement of the cut sections of material on the same level, said guide means comprising a plurality of spaced guide bars projecting inwardly from the inner walls of each of the towers to the outer edges of the conveyor screws therein.

12. In an apparatus for eluting sugar from cut sections of sugar-bearing material wherein there is a counter-current flow between the cut sections of the material and an eluting liquid and the cut sections are continuously introduced at one end and discharged from the other end of the apparatus with said cut sections being completely immersed in the eluting liquid and maintained in their natural shape during their movement through the apparatus, the combination of two upstanding elution towers, said towers being in communication with each other at their lower ends, the first of said towers having inlet and outlet ports at its head end for the introduction of cut sections of a sugar-bearing material into the apparatus and for the discharge of raw juices therefrom, the second of said towers having discharge and inlet ports at its head end for the discharge of the eluted, cut sections of the sugar-bearing material from the apparatus and for the introduction of an eluting liquid therein, centrally disposed, rotatable shafts located in said towers, each of said shafts being supported, respectively, by bearings located outside of the path of movement of the cut sections through the towers, conveyor screws carried by the shafts in the towers, guide means projecting inwardly from the inner walls of each of the towers, said guide means having portions engaging with the cut sections of material carried on the conveyor screws and preventing circulatory movement thereof on the same level, means at the discharge end of the second tower for removing a portion of the eluting liquid adhering to the cut sections prior to their discharge, and press means for removing further liquid from the cut sections after discharge thereof from the second tower, said press means having a connection to one of the eluting towers for returning the pressed liquid thereto.

KARL WILHELM HILDEBRANDT.

REFERENCES CITED

The following references are of record in the file of this patent:

UNITED STATES PATENTS

| Number | Name | Date |
|---|---|---|
| 418,262 | Young | Dec. 31, 1889 |
| 674,483 | Steffen | May 11, 1901 |
| 706,669 | Kessler | Aug. 12, 1902 |
| 746,734 | Naudet | Dec. 15, 1903 |
| 755,546 | Rak | Mar. 22, 1904 |
| 786,154 | Rigney | Mar. 28, 1905 |
| 802,331 | Schwarz | Oct. 17, 1905 |
| 934,349 | Philipp | Sept. 14, 1909 |
| 1,409,797 | Thornycroft | Mar. 14, 1922 |
| 1,555,432 | Olier | Sept. 29, 1925 |
| 1,961,420 | Hildebrandt | June 5, 1934 |
| 2,390,131 | Silver | Dec. 4, 1945 |
| 2,468,720 | Silver | Apr. 26, 1949 |

FOREIGN PATENTS

| Number | Country | Date |
|---|---|---|
| 519,710 | Germany | Mar. 3, 1931 |
| 597,408 | France | Aug. 29, 1925 |
| 645,086 | France | June 25, 1928 |